Sept. 13, 1960 C. G. ROPER ET AL 2,952,501
MULTIPLE PEN RECORDING APPARATUS
Filed Sept. 13, 1957 2 Sheets-Sheet 2

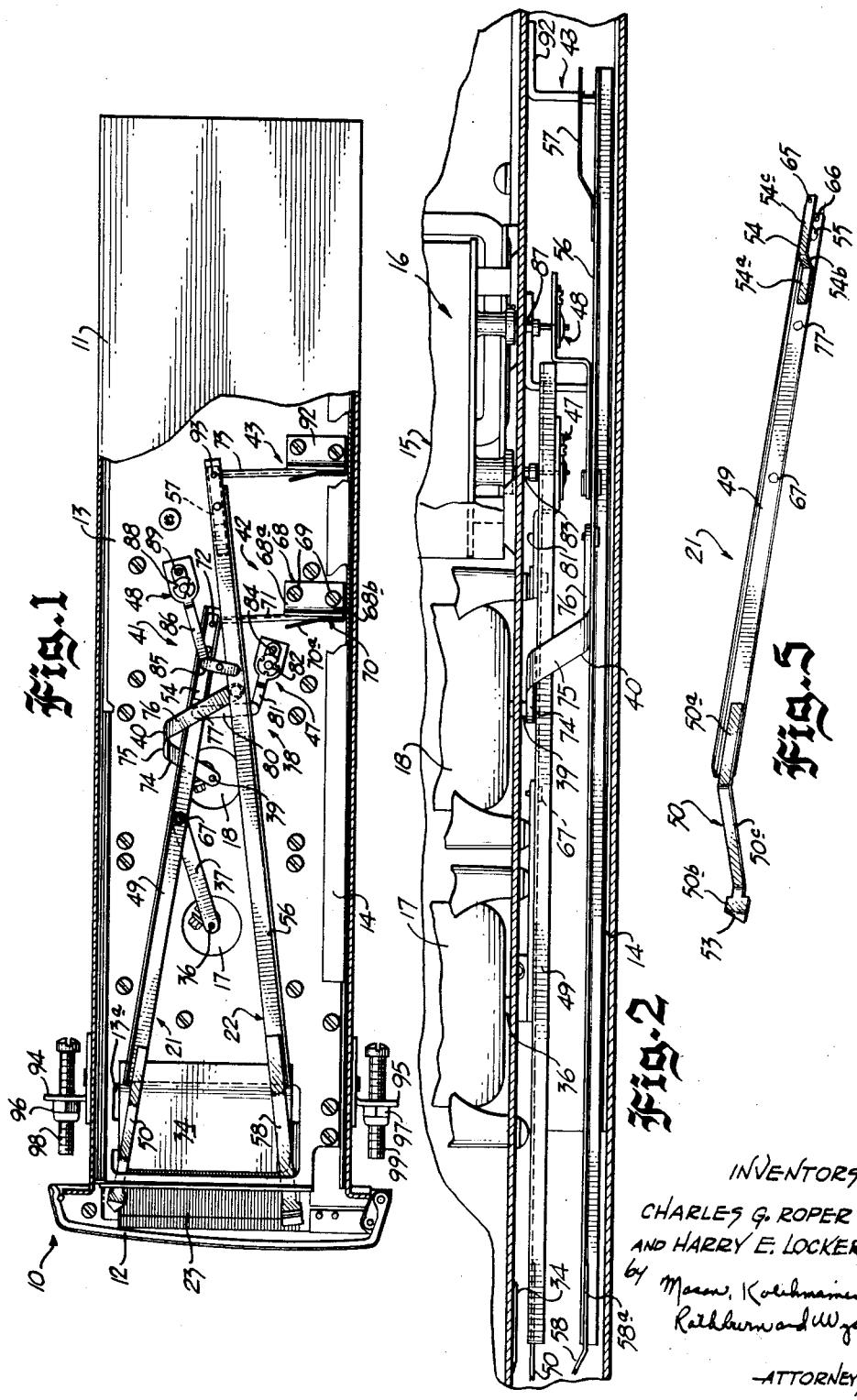

INVENTORS
CHARLES G. ROPER
AND HARRY E. LOCKERY

ATTORNEYS

United States Patent Office 2,952,501
Patented Sept. 13, 1960

2,952,501

MULTIPLE PEN RECORDING APPARATUS

Charles G. Roper, Fairfield, and Harry E. Lockery, Hamden, Conn., assignors, by mesne assignments, to Robertshaw-Fulton Controls Company, Richmond, Va., a corporation of Delaware Filed Sept. 13, 1957, Ser. No. 683,770

3 Claims. (Cl. 346—17)

The present invention relates generally to recording apparatus for use in automatic industrial process control systems and, more particularly, to a new and improved recording apparatus for producing simultaneously a plurality of records or indications respectively representative of different process variables.

While the present invention is of general utility, it is particularly well suited for use with and will be described in connection with an automatic process control system of the type shown and described in the copending appliction of Charles G. Roper and Edgar S. Gilchrist, Serial No. 389,564, filed November 2, 1953, and assigned to the same assignee as the present invention. In process control systems of the type disclosed in the latter application, the output of a primary measuring element in the system is conveyed into a direct current signal for transmission from the process area to a control area where the electrical signal is used to operate recording, indicating and/or apparatus for controlling the process variable measured by the measuring element. It is frequently desirable to measure a plurality of such variables simultaneously and to provide a corresponding number of electrical signals each having a standardized current range, for example 0.5 to 5.0 milliamperes, which signals are adapted to be recorded on a common record medium in order to provide continuous and permanent records of the magnitudes of the measured process variables. In accordance with the present invention, the electrical signals are employed to drive recording instruments each carrying a pen which is movable over a strip type record or chart, thereby producing a plurality of signal traces respectively indicative of the magnitude or level of the electrical signals at the input of the recorder. It is desirable that the recording pens be movable throughout the entire width of the strip chart without obstructing or interfering with each other. Accordingly, one of the principal objects of the present invention is to provide a new and improved recording apparatus of the type employing a number of recording instruments which are operable in the manner indicated above.

Another object of the present invention is to provide a new and improved recording apparatus employing a number of recording instruments which are movable over a continuously driven strip chart wherein each instrument may be moved throughout the width of the chart without interfering with the operation of the remaining instruments.

A further object of the present invention is to provide a new and improved recording apparatus of the type employing a plurality of movable recording instruments wherein a continuous indication is provided on the position of each recording instrument so that information concerning the magnitude of each process variable is constantly available.

The invention, both as to its organization and method of operation, together with further objects and advantages, thereof, will best be understood by reference to the following specification taken in connection with the accompanying drawings, in which:

Fig. 1 is a side elevational view of a recording apparatus characterized by the features of the present invention with a portion of its housing or casing broken away in order to illustrate certain details of construction;

Fig. 2 is an enlarged fragmentary, sectional view showing particularly the linkage arrangement employed in driving the recording instruments of the apparatus shown in Fig. 1;

Fig. 5 is a perspective view of one of the recording instruments employed in the apparatus illustrated in Fig. 1.

Figures 3, 4:
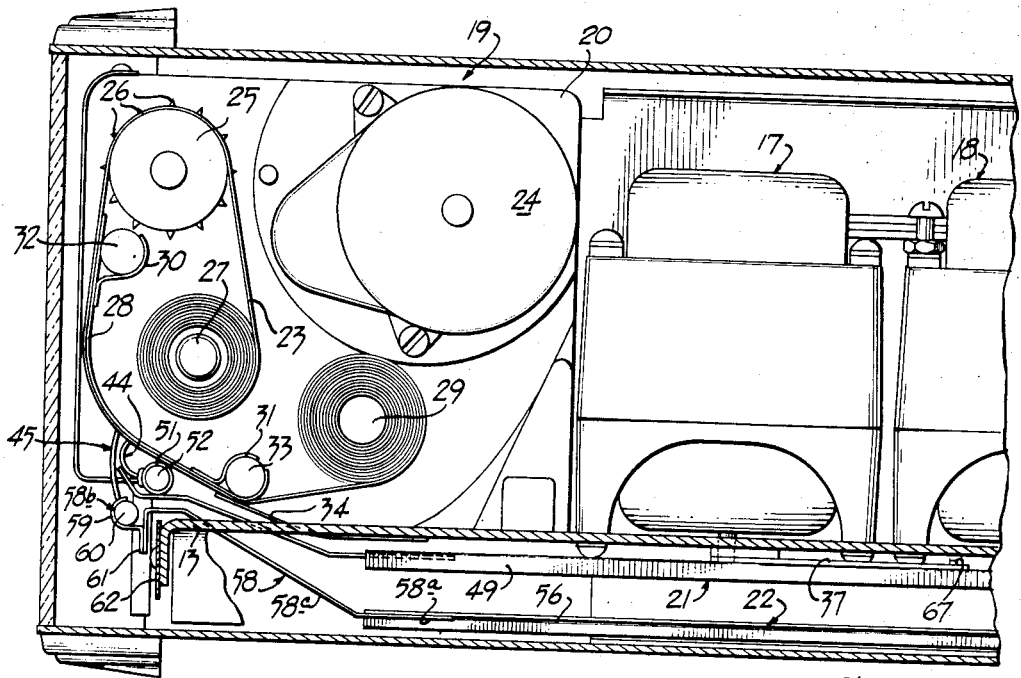
Fig. 3 is an enlarged, fragmentary, top plan view of a portion of the recording apparatus illustrated in Fig. 1 and showing particularly the driving mechanism for the strip chart and the recording instruments movable over this chart.
Fig. 4 is an enlarged, front elevational view of the recording apparatus illustrated in Fig. 1.

Referring now to the drawings and more particularly to Fig. 1 thereof, the recording apparatus of the present invention is generally identified by the reference numeral 10 and includes a somewhat rectangular or box-like casing 11 having a hinged front door or cover 12 which may be opened to permit access to the components within the casing. For the purpose of mounting or supporting the component elements of the recording apparatus 10 a main vertical chassis or frame 13 is positioned within the casing 11 for sliding movement along guide rails or tracks 14.

Considered generally, the recording apparatus 10 comprises a pair of electromechanical balance units 15 and 16 shown in Fig. 2, a pair of actuator assemblies or rotary solenoids 17 and 18 mounted on the main frame 13 as illustrated in Figs. 2 and 3, strip chart driving mechanism 19, which is mounted upon a sub-chassis 20 and is best shown in Fig. 3, and a pair of recording instruments 21 and 22 for producing indications or records on a strip chart 23 driven by the mechanism 19. Considering first the chart driving mechanism 19 which is adapted continuously to move the strip chart 23 past the recording instruments 21 and 22 in order to enable the latter to produce a pair of traces or records on the chart, it will be observed that this mechanism includes a drive motor 24 the output of which is connected through suitable reduction gearing (not shown) to a drive sprocket 25 having teeth 26 in engagement with suitable perforations in the edge of the strip chart 23. The strip chart passes from a supply spool or core 27 over the drive sprocket 25 extends along a backing plate 28, passes through an opening 13a (Fig. 1) in the main frame and is wound onto a takeup spool 29 which is driven by the motor 24. The backing plate 28 is held in position by means of clips 30 and 31 which respectively encircle posts 32 and 33 on the sub-chassis 20. The strip 23 is maintained in engagement with the backing plate 28 by means of guide plate 34 which cooperates with the backing plate to form an exit passage through which the strip emerges to the takeup spool 29. The motor 24 is preferably driven at a rate sufficient to move the entire chart from the supply spool 27 to the takeup spool 29 during a 30 day period after which the used chart may be removed from the apparatus 10 and a clean or unused chart may be inserted. Of course, other driving rates may be employed if desired. As mentioned above, removal of the used chart and insertion of a new or unused chart is accomplished by opening the hinged access door 12.

The electromechanical balance units 15 and 16 are excited by electrical signals developed at the process area and these electrical signals are applied to an electrical circuit including the balance units in a manner described in detail in the above identified Roper and Gilchrist application Serial No. 389,564, to which reference may be had for a detailed description of the circuit. The output of the electromechanical balance unit 15 including its associated oscillator circuit is applied to the rotary solenoid 17 which has its rotor 36 connected to drive the recording instrument 21 through a link arm 37. The recording instrument 21 is connected through linkage 38 to the beam of the balance unit 15 in order to apply mechanical feedback signal to the beam and, hence, to rebalance the torque produced by the input signal applied to an input coil mounted upon the beam in the manner described in the above identified Roper et al. application. The latter coil is positioned within a magnetic field set up within an annular air gap in the magnetic structure of the electromechanical balance unit 15 which field is varied in accordance with changes in the input signal supplied from the process area to the balance unit.

In similar manner, the output of the electromechanical balance unit 16 and its associated oscillator circuit is applied to the rotary solenoid or actuator 18 which has its output rotor 39 connected through an arm 40 to drive the recording instrument 22. In order to apply a mechanical feedback signal to the balance beam of the electromechanical balance unit 16, the recording instrument 22 is connected through a mechanical linkage 41 to the beam of the unit 16. The mechanical feedback signal applied through the linkage 41 thus balances the torque produced by the input signal applied to the input coil mounted on the balance beam of the unit 16. The recording instruments 21 and 22 are pivotally connected to lever and bracket assemblies 42 and 43 which convert the rotary movement of the rotors 36 and 39 and the link arms 37 and 40 into substantially straight line motion of the recording pens of the instruments 21 and 22. The latter pens are identified by the reference numerals 44 and 45 in Fig. 3 and are moved vertically over the strip chart 23 in response to changes in the input signals supplied to the electromechanical balance units 15 and 16. The zero position of the recording pen 44 may be adjusted by means of an adjusting mechanism identified generally by the refreence numeral 47 so that the recording apparatus 10 may be calibrated mechanically to a standard current input signal in a manner described more fully hereinafter. Similarly, the zero position of the recording pen 45 may be adjusted by mechanism identified generally by the reference numeral 48.

Considering more particularly the recording instrument 21, it will be observed that this instrument includes an elongated lever 49 having a resilient metal pen supporting arm 50 secured at its forward end. The arm 50 includes a portion 50a welded or otherwise secured to the lever 49, an end portion 50b and an inclined connecting portion 50c. The end portion 50a, as is best shown in Figure 3 carries a clip 51 for embracing a cylindrical well 52 containing a supply of ink for recording pen 44. The tip of the pen 44 is urged against the strip chart 23 by the resilience of the arm 50. The end portion 50b also includes a pointer 53 which overlies the strip chart 23 and cooperates with vertical graduations (Fig. 4) on this chart to provide an indication of the position of the recording pen 44 with respect to the chart. To facilitate a reading of the pen position, the pointer 53 is preferably painted a distinctive color.

The rearward end of the lever 49 carries a bracket 54 having a leg 54a welded or otherwise secured to the lever, an offset arm 54b and a rearwardly extending leg 54c spaced from but extending parallel to the lever 49. A post 55 is connected between the leg 54c and the lever 49 to maintain the separation between these elements. Aligned apertures 65 and 66, respectively, provided in the leg 54c and the lever 49 receive a pivot pin 72 to effect a pivot connection between the lever and bracket assembly 42. A stake 67 is formed on the lever 49 and extends through an aperture in the end of the arm 37 to provide a pivot connection while a similar stake 77 on the lever 49 provides a pivot connection for the linkage 38.

The recording instrument 22 also includes an elongated lever 56 carrying on its rearward end a bracket 57 which is identical with the bracket 54 described above. On its forward end the lever 56 carries a resilient pen supporting arm 58 having a leg portion 58a welded or otherwise secured to the lever 58, an end portion 58b and an inclined connection portion 58c. The end portion 58 is bent as indicated at 59 to embrace a cylindrical well 60 containing a supply of ink for the recording pen 45. The tip of the pen 45 is, of course, urged against the strip chart 23 by the resilience of the arm 58. The end portion 58b also includes a section 61 which is shaped to provide a pointer overlying a graduated scale 62 secured to the main frame 13 by means of screws 63 shown in Fig. 4. The pointer 61 cooperates with the graduations on the scale 62 to provide a continuous indication of the position of the recording pen 45 along the strip chart 23. It will be observed from Fig. 4 that the graduations on the scale 62 are accurately aligned with the graduations extending transversely of the strip chart 23 so that the indications provided by the pointers 53 and 61 are correlated. To facilitate the described alignment of the graduations, the scale 62 is provided at its upper and lower edges with elongated slots 64 and 65 which accommodate the screws 63. The latter screws may be loosened to permit vertical adjustment of the scale position until its graduations are accurately aligned with the graduations of the chart. It will be observed that the use of separate graduations for indicating the positions of the pens 44 and 45 permits movement of each pen from one edge of the chart 23 to the other without interfering with the movement of the other pen and at no time do the pointers 53 and 61 overlie each other to prevent an accurate reading of their associated graduations.

The lever and bracket assemblies 42 and 43 are of identical construction and, hence, only one of these assemblies will be described in detail. Thus, the lever and bracket assembly 42 includes an L-shaped bracket 68 having a leg portion 68a secured to the main frame 13 by means of machine screws 69 and also having a right-angled leg portion 68b which cooperates with a clamping plate 70 spot welded on the leg 68b to mount the lower end of a thin, resilient support arm 71. The upper end of the support arm 71 is secured to the pivot pin 72 extending through the aligned apertures 65 and 66. By this arrangement the rotary movement of the link arm 37 in response to rotation of the rotor 36 produces substantially linear vertical movement of the recording pen 44. The clamping plate 70 includes an inclined tongue 70a which functions as a stop for limiting movement of the lever 49 toward the left as viewed in Fig. 1 while the leg 68b of the bracket 68 limits movement of the lever toward the right. Similarly, the lever and bracket assembly 43 includes a bracket member 92 for supporting a thin, resilient arm 73 pivotally connected by pin 93 to the elongated lever 56 for the purpose of transforming the rotary movement of the arm 40 into linear movement of the lever 56 and the recording pen 45 carried by this lever.

In order to permit the pens 44 and 45 to move from one edge of the chart 23 to the other without interference, the link arm 40 is of substantially U-shape and includes a leg portion 74 underlying the lever 49 and connected to the rotor 39 of the solenoid 18. The arm 40 further includes a central or bight portion 75 and a leg 76 overlying the lever 49 and pivotally connected to the lever 56. The use of this U-shaped arm, as indicated above, permits the lever 49 to move between the legs 74 and 76 without encountering or engaging any of the linkage connected to the lever 56. Similarly, since the lever 56 moves in a plane which is offset from the plane of movement of the lever 49, the former may move the pen 45 from one edge of the strip chart 23 to the other without engaging any of the linkage associated with the lever 49.

Considering now the details of the linkage 38 and the zero adjusting mechanism 47, it will be observed that the linkage 38 includes a link arm 80 pivotally connected at one end to the stake 77 and pivotally connected at its other end to a support bracket 81. The bracket 81 is secured to a toothed bushing 82 press fitted onto the end of a shaft 83 at the input of the electromechanical balance unit 15. The bracket 81 is held in position by means of a spring washer in the manner shown and described in detail in the above identified Roper et al. application Serial No. 389,564. The bracket 81 also carries an adjusting gear 84 having teeth in engagement with the teeth of the bushing 82 so that the adjusting gear may be turned by means of a screwdriver or the like to alter the position of the bracket 81 without at the same time turning the input shaft 83. In this manner the elongated lever 49 may be moved to alter the position of the pen 44 without inducing a corresponding variation in the mechanical force applied ot the beam of the electromechanical balance unit 15, thereby to obtain a zero adjustment. Similarly, the linkage 41 includes a link arm 85 and a bracket 86 which is connected to the input shaft 87 of the electromechanical balance unit 16 through the zero adjusting mechanism 48. The latter zero adjusting mechanism is identical to the mechanism 47 and includes a toothed bushing 88 having teeth in engagement with an adjustable gear 89 so that the latter gear may be turned in order to alter the position of the bracket 86 on the shaft 87 and hence, to provide a zero adjustment of the position of the recording pen 45. The pens 44 and 45 are calibrated for a standard input current having a range of from 0.5 to 5.0 milliamperes and, accordingly, a zero indication of each pen position should be obtained when the input current is 0.5 milliampere. Accordingly, the recording instrument 21 is calibrated by supplying an input current of 0.5 milliampere to the balance unit 15 and adjusting the zero adjust mechanism 47 until the pointer 53 coincides with the zero point on the scale of the strip chart 23. The calibration is completed by supplying a current of 5.0 milliamperes to the electromechanical balance unit 15 and adjusting the electrical circuit of the latter unit to provide a full scale indication so that the pointer 53 coincides with the "100" or full scale mark of the scale on the strip chart 23. The recording instrument 22 is calibrated in exactly the same manner as the instrument 21, that is, by supplying a 0.5 milliampere current at the input of the electromechanical balance unit 16 and adjusting the mechanism 48 until the pointer 61 coincides with the zero mark on the scale 62 and by thereafter supplying a 5.0 milliampere current to the unit 16 and adjusting the electrical circuit of the latter unit until full scale deflection of the recording pen 45 is produced, at which time the pointer 61 overlies the "100" mark of the scale 62.

Mounting brackets 94 and 95 may be secured to the top and bottom walls of the casing 11 as illustrated in Fig. 1 for the purpose of mounting the recording apparatus 10 at the control area. These brackets carry nuts 96 and 97 for accommodating bolts 98 and 99 to accomplish the mounting.

In view of the foregoing description it will be recognized that the recording apparatus 10 is capable of producing a pair of traces or continuous indications on the strip chart 23 as the latter is continuously driven with each of the indications provided representing the level or magnitude of one of the input signals from the process area. These traces may cross over, that is, the pens 44 and 45 may pass from one edge of the chart 23 to the other without encountering obstruction from the other pen or its associated drive mechanism. Moreover, both pens may be moved beyond the edges of the strip chart 23 in order to facilitate removal or replacement of the chart. All of these results are achieved by a mechanism which is relatively simple in construction and, hence, can be manufactured at relatively low cost on a mass production basis.

While a particular embodiment of the invention has been shown and described it will be recognized that various modifications will readily occur to those skilled in the art and it is therefore contemplated by the appended claims to cover any such modifications as fall within the true spirit and scope of the invention.

What is claimed as new and is desired to be secured by Letters Patent of the United States is:

1. A two pen recording apparatus for use in a process control system to produce on a continuously moving chart a pair of traces respectively representative of the magnitude of first and second electrical signals corresponding to difference process variables, said apparatus comprising first and second electromechanical balance units respectively excited by said first and second electrical signals and respectively developing first and second control signals; first and second rotary actuators respectively responsive to said first and second control signals; a first lever driven by said first actuator and movable in a first plane about a first axis remote from said chart; a first pen on said first lever in engagement with said chart and movable in a direction extending transversely to the direction of movement of the chart; a second lever mounted for pivoting movement about a second axis displaced from said first axis; a second pen on the second lever in engagement with the chart and movable in a direction extending transversely to the direction of movement of the chart; a U-shaped arm connecting the second actuator to the second lever at a point intermediate said second axis and said second pen; said arm having a first leg portion connected to said second actuator and underlying said first lever intermediate said first axis and said first pen, a second leg portion connected to said second lever and extending over said first lever, and a bight portion connecting the first and second leg portions and spacing said second lever from said first lever so that said second lever is movable in a second plane which is offset from said first plane while said first lever is movable between said leg portions, thereby to permit movement of each of said pens across the entire width of said chart without interfering with the operation of the other pen and its associated lever; a first mechanical drive connected to said first lever at a point intermediate said first axis and said first pen and extending beneath said second lever to said first electromechanical balance unit to apply a mechanical feedback force to the first unit; a second mechanical drive connected to the second lever at a point intermediate the second axis and the second pen and extending above said first lever to the second electromechanical balance unit to supply a mechanical feedback force to said second unit; each of said mechanical connections including a manually adjustable zero adjusting mechanism for obtaining correlation between the pen positions and the magnitude of the electrical signals; graduations on said chart; a fixed scale on said apparatus having graduations in alignment with the graduations on said chart; a first pointer on said first lever cooperating with the chart graduations to indicate the position of the first pen; and a second pointer on the second lever cooperating with the fixed scale to indicate the position of the second pen.

2. A two pen recording apparatus for use in a process control system to produce on a continuously moving chart a pair of traces respectively representative of the magnitude of first and second electrical signals corresponding to different process variables, said apparatus comprising first and second electromechanical balance units respectively excited by said first and second electrical signals and respectively developing first and second control signals; first and second rotary actuators respectively responsive to said first and second control signals; a first lever driven by said first actuator and movable in a first plane about a first axis remote from said chart; a first pen on said first lever in engagement with said chart and movable in a direction extending transversely to the direction of movement of a chart; a second lever mounted for pivoting movement about a second axis displaced from said first axis; a second pen on the second lever in engagement with the chart and movable in a direction extending transversely to the direction of movement of the chart; a U-shaped arm connecting the second actuator to the second lever at a point intermediate said second axis and said second pen; said arm having a first leg portion connected to said second actuator and underlying said first lever intermediate said first axis and said first pen, a second leg portion connected to said second lever and extending over said first lever, and a bight portion connecting the first and second leg portions and spacing said second lever from said first lever so that said second lever is movable in a second plane which is offset from said first plane while said first lever is movable between said leg portions, thereby to permit movement of each of said pens across the entire width of said chart without interfering with the operation of the other pen and its associated lever; a first mechanical drive connected to said first lever at a point intermediate said first axis and said first pen and extending beneath said second lever to said first electromechanical balance unit to apply a mechanical feedback force to the first unit; a second mechanical drive connected to the second lever at a point intermediate the second axis and the second pen and extending above said first lever to the second electromechanical balance unit to supply a mechanical feedback force to said second unit; graduations on said chart; a fixed scale on said apparatus having graduations in alignment with the graduations on said chart; a first pointer on one of said levers cooperating with the chart graduations to indicate the position of the pen on said one lever, and a second pointer on the other of said levers cooperating with the fixed scale to indicate the position of the pen carried by said other lever.

3. A recording apparatus for use in a process control system to produce on a continuously moving chart a pair of traces corresponding to different process variables, said appartus comprising first and second drive means; a first lever driven by said first drive means and mounted adjacent one end for movement in a first plane about a first axis remote from said chart, a first recording device driven by the other end of said first lever for producing a first of said traces on said chart and movable in a direction extending transversely to the direction of movement of the chart; a second lever mounted adjacent one end for pivoting movement about a second axis displaced from the first axis; a second recording device driven by the other end of the second lever for producing a second of the traces on the chart and movable in a direction extending transversely to the direction of movement of the chart; a U-shaped arm connecting the second drive means to the second lever at a point intermediate its ends; said arm having a first leg portion connected to said second drive means and underlying said first lever intermediate its ends, a second leg portion pivotally connected to said second lever at a point spaced from the axis of said second drive means and extending over said first lever, and a bight portion connecting the first and second leg portions and spacing said second lever from said first lever so that said second lever is movable in a second plane which is offset from the plane of movement of said first lever while said first lever is movable between said leg portions, thereby to permit movement of each of said recording devices across the entire width of said chart without interfering with the operation of the other recording device and its associated lever; graduations on said strip chart; a fixed scale on said apparatus having graduations in alignment with the graduations on said chart; a first pointer on said first lever cooperating with the chart graduations to indicate the position of the first recording device; and a second pointer on the second lever cooperating with the fixed scale to indicate the position of the second recording device.

References Cited in the file of this patent

UNITED STATES PATENTS

| | | |
|---|---|---|
| 639,180 | Martin | Dec. 12, 1899 |
| 959,313 | Crabbs | May 24, 1910 |
| 1,031,042 | Conrad et al. | July 2, 1912 |
| 1,778,702 | Bristol et al. | Oct. 14, 1930 |
| 2,002,686 | Belaef | May 28, 1935 |
| 2,006,882 | Cleveland et al. | July 2, 1935 |
| 2,395,658 | Disney | Feb. 26, 1946 |
| 2,710,787 | Witt | June 14, 1955 |

FOREIGN PATENTS

| | | |
|---|---|---|
| 671,379 | Germany | Feb. 6, 1939 |